(12) United States Patent
Sinha et al.

(10) Patent No.: US 9,357,242 B2
(45) Date of Patent: May 31, 2016

(54) METHOD AND SYSTEM FOR AUTOMATIC TAGGING IN TELEVISION USING CROWD SOURCING TECHNIQUE

(75) Inventors: Priyanka Sinha, Kolkata (IN); Rohit Kumar Gupta, Kolkata (IN); Avik Ghose, Kolkata (IN); Bhaumik Chirabrata, Kolkata (IN); Diptesh Das, Kolkata (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/125,011

(22) PCT Filed: Jun. 7, 2012

(86) PCT No.: PCT/IN2012/000404
§ 371 (c)(1),
(2), (4) Date: Dec. 9, 2013

(87) PCT Pub. No.: WO2013/051014
PCT Pub. Date: Apr. 11, 2013

(65) Prior Publication Data
US 2014/0101691 A1    Apr. 10, 2014

(30) Foreign Application Priority Data
Jun. 10, 2011   (IN) .................. 1702/MUM/2011

(51) Int. Cl.
*H04N 7/10* (2006.01)
*H04N 7/025* (2006.01)
(Continued)

(52) U.S. Cl.
CPC .......... *H04N 21/235* (2013.01); *G06F 17/3082* (2013.01); *H04H 60/48* (2013.01); *H04H 60/64* (2013.01); *H04H 60/80* (2013.01);
(Continued)

(58) Field of Classification Search
CPC ............ H04N 21/812; H04N 21/8126; H04N 21/8133; H04N 21/235
USPC ................................. 725/32, 51, 60
See application file for complete search history.

(56) References Cited

U.S. PATENT DOCUMENTS

| 6,357,042 B2 | 3/2002 | Srinivasan et al. |
| 8,285,121 B2 | 10/2012 | Kulas |

(Continued)

OTHER PUBLICATIONS

"Demo Abstract: mCrowd—A Platform for Mobile Crowdsourcing. Nov. 4, 2009".*

(Continued)

*Primary Examiner* — Yassin Alata
(74) *Attorney, Agent, or Firm* — Finnegan, Henderson, Farabow, Garrett & Dunner, LLP

(57) ABSTRACT

A method and system for tracking of objects in a video is disclosed. The method of the present invention enables user to indicate a boundary-box to the identified object of interest in the broadcast video on television or any other communication media. The object indicted in the boundary-box is than tracked by the users connected in a social community network in the upcoming video frames of the broadcasted video. The tracked object is then tagged by the users in the social community network. Further, the present invention enables augmentation of the tracked object in the video by extracting additional information from the online service providers. The augmentation and tagging of the object generates metadata related to the object. The metadata generated is stored on a server to track the object in future based on the metadata related to the object.

13 Claims, 3 Drawing Sheets

(51) Int. Cl.
| | |
|---|---|
| G06F 3/00 | (2006.01) |
| H04N 21/235 | (2011.01) |
| G06F 17/30 | (2006.01) |
| H04N 21/24 | (2011.01) |
| H04N 21/278 | (2011.01) |
| H04N 21/4545 | (2011.01) |
| H04N 21/472 | (2011.01) |
| H04N 21/81 | (2011.01) |
| H04H 60/48 | (2008.01) |
| H04H 60/64 | (2008.01) |
| H04H 60/80 | (2008.01) |
| H04H 20/08 | (2008.01) |

(52) U.S. Cl.
CPC ............ *H04N 21/24* (2013.01); *H04N 21/278* (2013.01); *H04N 21/45455* (2013.01); *H04N 21/47205* (2013.01); *H04N 21/8133* (2013.01); *H04H 20/08* (2013.01)

(56) References Cited

U.S. PATENT DOCUMENTS

| | | | |
|---|---|---|---|
| 8,520,979 | B2 | 8/2013 | Conwell |
| 2001/0023436 | A1* | 9/2001 | Srinivasan ............ G06T 7/2033 709/219 |
| 2008/0086369 | A1* | 4/2008 | Kiat ....................... G06Q 30/02 705/14.41 |
| 2008/0313272 | A1 | 12/2008 | Nguyen et al. |
| 2009/0094520 | A1 | 4/2009 | Kulas |
| 2009/0327894 | A1* | 12/2009 | Rakib ..................... G11B 27/34 715/719 |
| 2010/0008639 | A1 | 1/2010 | Greenberg et al. |
| 2010/0242074 | A1* | 9/2010 | Rouse ................... H04L 12/588 725/100 |
| 2011/0040754 | A1 | 2/2011 | Peto et al. |

OTHER PUBLICATIONS

Julia Noordegraaf, "Remembering the Past in the *Dynarchive*: The State of Knowledge in Digital Archives", University of Amsterdam (May 13-15, 2011).

Riste Gligorov et al. "On the role of user-generated metadata in audio visual collections." Proceedings of the sixth international conference on Knowledge capture. ACM (2011).

Tingxin Yan et al. "mCrowd: a platform for mobile crowdsourcing." Proceedings of the 7th ACM Conference on Embedded Networked Sensor Systems. ACM (2009).

International Search Report mailed Mar. 15, 2013, in International Application No. PCT/IN2012/000404.

* cited by examiner

METHOD AND SYSTEM FOR AUTOMATIC TAGGING IN TELEVISION USING CROWD SOURCING TECHNIQUE

CROSS-REFERENCE TO RELATED PATENT APPLICATIONS

This application is a National Stage Entry of International Application No. PCT/IN2012/000404, filed Jun. 7, 2012, which claims priority from Indian Patent Application No. 1702/MUM/2011, filed Jun. 10, 2011. The entire contents of the above-referenced applications are expressly incorporated herein by reference.

FIELD OF THE INVENTION

The invention generally relates to the field of identification and tagging of objects in video. More particularly, the invention relates to a method and system for efficient tagging of objects in a video broadcasted over a communication media using crowd sourcing technique.

BACKGROUND OF THE INVENTION

There has been a rapid growth in the availability and retrieval of information through the World Wide Web. The web contains large volume of data that is stored in database data structures such as database tables or indexes or files. The data stored may be of different formats, different types, and may contain different domain-specific information.

The web has gained importance due to its usage in different applications such as e-commerce, hospitality, social networking etc. It enables individuals across the globe to collaborate together. The internet websites contain various files stored on the server receiving requests from different clients for retrieval of data hosted by these websites.

Search engines such as Google™, Yahoo® etc facilitate searching through the large volume of data by indexing the keywords and establishing relevancy thereof with user search criterion. Most of the search engines provide set of results that are based on keywords used by the user in the search queries formulated for searching over the web and are generally presented in the descending order of relevancy.

Most of the users tend to search the information from the web that is relevant to the domain in which they are interested. So, while searching users normally use keywords and variants thereof to obtain relevant set of results. However, information retrieval from large volume of data with different formats, types and context is a problematic and a tedious task.

Moreover, if the file to be searched is media file then it is not possible to search the required media file using keywords media content does not contain associated keywords.

For example, if the user is searching a video or a photo from the website storing videos or photos, then it will be very difficult for the user to search for a particular video or photo in which she is interested due to lack of keywords or metadata associated with the file. Thus, these files need to be tracked and identified in an efficient manner so that they can be retrieved easily.

One method that has gained importance today is online tagging of objects. The tagging helps in object recognition. The tagging is the phenomenon wherein the users connected on internet add tags to the file or movie clip or image stored on the internet so that it can be searched easily by the user interested in searching these stored files on the internet. This is referred as "Social Tagging".

Further, the social tagging enables storage of tags generated from multiple users on the server and associates these tags to a particular group. This allows social communities to maintain their own sets of tags for the same objects in the same video. This leads to faster and more relevant searches when a user is using the tag to search for objects (and related video, metadata, etc) in a particular social community. For example, the social community interested in Smartphones may generate a social group in context to Smartphones and store the tags generated from the Smartphone community members in a database storing tags generated from the users related to the Smartphones. This facilitates in searching of any particular social community group as well, for example Smartphones group in this case.

Efforts have been made in the past for online tagging of objects. Few of those known to us are as follows:

One such augmented reality application known to us is Google™ Goggles that is able to direct relevant searches and therefore information from an image.

Further, there exist open source projects that deal with object tracking, in particular motion history image. In OpenCv there are a number of tracking methods such as Camshift & Meanshift demo, lkedemo, eye tracking.

Social networking on TV is although a very recent concept, has been gaining traction as a showcase application for Social TV.

Tagging on the other hand has been used with some success to auto-generate metadata information by geo-locating photographs taken by mobile phones.

Manual tagging has greatly improved image search as can be seen with Flickr® and Picasa™ from Yahoo® and Google™ respectively.

Also, there exists APIs in the art such as Future API and Amazon's Mechanical Turk HITs that are being used to tag proprietary videos or surveillance videos for a fee.

Current social TV applications allow users to view what other users connected to them are watching and often use that to create communities and allow users to chat on the same. This level of interaction, however, is limited to text.

Although there has been extensive research on the motion tracking of the objects, attaching meaning to the object tracked and identified is still a hard computational problem. Moreover, tracking of videos itself is a problem due to very low resolution of the videos. Further, the problem with tracking of videos increases due to varying environmental conditions such as illumination, occlusion problems etc.

Also, if the object to be tracked is moving at high speed, it is difficult to tack it. Similarly, the object with low frame rate is difficult to track.

As will be appreciated, there is a clear need for an improved method of processing and metatagging image content such as video content that would simplify the long-standing computationally hard problem of image processing for object identification and recognition, which would further alleviate many of the problems outlined above.

OBJECTIVES OF THE INVENTION

The principal objective of the present invention to provide a method and system that enables real-time tracking of objects in a video broadcasted on a television using crowd sourcing.

Yet another objective of the invention is to enable indication of box to set boundaries for identifying the object to be tracked in a video broadcasted on a television or any other communication media.

Yet another objective of the invention is to enable tagging of the identified object in the video by various users connected in a social community network.

Yet another objective of the invention is to enable augmentation of tagged object by collecting additional information i.e. metadata from different online service providers related to the tagged object.

Yet another objective of the invention is to enable generation of metadata based on tagging and augmentation of the object.

Still another objective of the invention is enable storage of the metadata generated related to the object on a server for tracking the said object in the future.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The following text presents a simplified, incomplete summary in order to provide an orientation to certain aspects of the disclosed subject matter. This Summary is not an extensive overview. It is not intended to identify key/critical elements or to delineate the scope of the claimed subject matter. Its sole purpose is to present some concepts in a simplified form as a prelude to the more detailed description that follows.

The present invention provides method and system tracking objects of interest on a broadcasted video by tagging the objects tracked using crowd sourcing technique.

The present invention enables a method by which users can interact using objects on a broadcast video. The objects of interest may include an actor, a merchandise item, a gadget or a vehicle etc. These objects are identified, bounded by a box and then tagged by the users.

Further, the present invention enables these tags to be shared across the users via an aggregation server where users are allowed to correct and augment the generated tags. The augmentation of tags can be done using online service that provides the users to extract more information for the tags. The tags may not be mere descriptions but might be student notes, Q & A, and general comments for an educational content. Similarly, other genre of broadcast can be similarly augmented.

The user inputs the bounding box on TV with a remote acting like a mouse or in air using gesture. The object in that box is then tracked over frames. The object to be tracked is accompanied with a dialog box where user tags are displayed. Moreover, the users are provided with share and ask buttons with the tags to allow social interaction with friends. This metadata is uploaded using REST.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and architecture disclosed in the drawings.

The description has been presented with reference to an exemplary embodiment of the invention. Persons skilled in the art and technology to which this invention pertains will appreciate that alterations and changes in the described method and system of operation can be practiced without meaningfully departing from the principle, spirit and scope of this invention.

Figure 1:
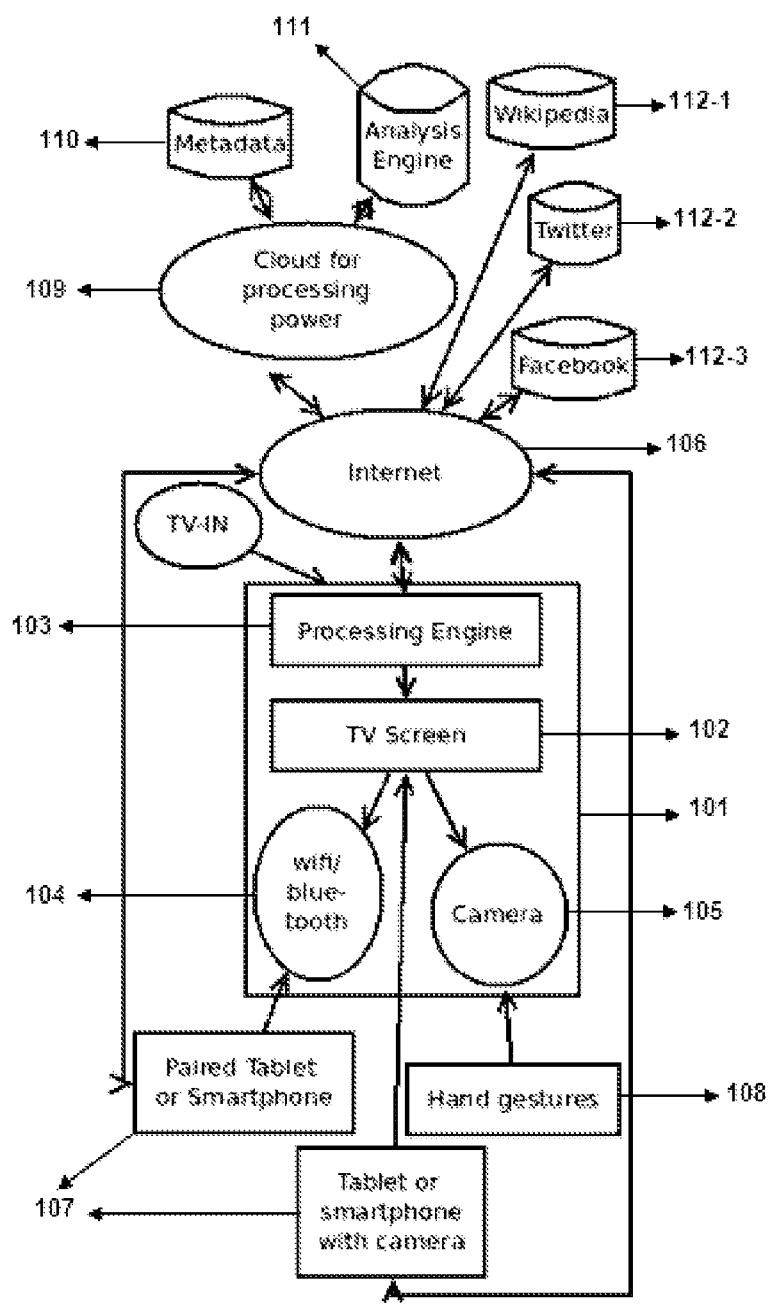
FIG. 1 schematically shows system diagram 100 containing different system elements for crowdsourced tagging and metadata generation on TV in accordance an embodiment of the invention.

FIG. 1 shows system diagram 100 for tracking of objects in a video broadcasted on a TV in accordance to an embodiment of the present invention. TV-IN 101 is shown that is used as broadcasting medium for broadcasting the various media content that is viewed by various subscribers worldwide. The TV-IN 101 as shown includes processing engine 103, TV screen 102 to display the content, Wi-Fi or Bluetooth device 104 embedded for enabling the communication with other pairing devices, camera 105 for capturing gesture inputs from a user watching the content on the TV-IN 101.

In an embodiment as shown in FIG. 1, the system 100 includes a Tablet/Smartphone 107 that is paired with the TV-IN 101 using standard protocol compatible devices such as Wi-Fi or Bluetooth device 104. In another embodiment, the Tablet/Smartphone 107 may be connected to the TV-IN 101 by other communication protocol means including but not limited to WAN, LAN, MAN, Internet and combinations thereof.

In an embodiment, the TV-IN 101 is connected to different online service providers including but not limited to information provider Wikipedia 112-1, social networking sites such as Twitter 112-2 and Facebook 112-3 by means of Internet connection 106. These service providers' enables people connected in a social community network to generate additional information about a video broadcasted on the TV-IN 101 by using crowd sourcing technique.

As shown in FIG. 1, a metadata database 110 is shown that is used to collect the metadata generated for a video displayed on the TV-IN 101. A cloud computing server 109 connected to the internet 106 enables processing of high computational power required by the pairing devices 107 connected to the Internet 106 while transfer of data. Further, an analysis engine 111 is shown that is used for analysis of images in the video displayed on TV-IN 101. As shown, the camera 105 enables capture of user Hand gestures 108 to identify the users' objects of interest in the video broadcasted on the TV-IN 101.

The system 100 shown in FIG. 1 in accordance to an embodiment of the present invention helps in tracking of different objects of interest in the video broadcasted on the TV-IN 101. This is explained as below.

In an embodiment, as shown in FIG. 1, a connected TV-IN 101 is paired with a handheld Tablet or Smartphone 107 via Bluetooth or WI-FI device 104. The screen area of the Tablet is matched corresponding to viewable area of the TV-IN 101. The video displayed on TV screen 102 of the TV-IN 101 is pushed on the paired Tablet or Smartphone using communication protocol such as Bluetooth or WI-FI depending on the type of devices used.

In an embodiment of the present invention, the user can input the objects in the video broadcasted on the TV-IN 101 in which she is interested. That is, at least one object in the video can be tracked to generate metadata. Such an object can be an actor, a merchandise item, a gadget or a vehicle etc.

In an embodiment of the present invention, these objects are identified by the user by indicating a boundary-box and then tagged by the users. In one embodiment of the present invention, the user can input the boundary-box indicating the area of interest in the broadcasted video to be tagged by the users connected in social-community network using remote input device such as mouse. In another embodiment, the input can also be given by the Tablet or Smartphone Camera 107 that points to the portion of the TV screen 102 desired. In still another embodiment, with camera support from the TV, Hand Gestures 108 can indicate the desired object boundaries on the screen as well.

In an embodiment, as-soon-as the object to be tracked is indicated in the boundary-box by the user using these input devices, tags may be inputted about the identified object of interest in the video broadcasted on TV-IN 101. The identified object of interest is accompanied with a dialog box where user tags are displayed. Further, in an embodiment of the present invention, share and ask buttons are provided with the tags to allow social interaction with friends.

For example, if the video of a movie is being played on the TV-IN 101, the user may indicate the object of interest in the video as an actor of the played movie, which is indicated by the boundary-box input by the user.

The next task is to track the identified object of interest in the upcoming frames. This is done by using the bounding box specified by the user in upcoming frames in real-time and then transmitting the tags to the network. In an embodiment, the tracking of the identified object of interest in the upcoming video frames is done by image matching technique implemented by the analysis engine 111 as shown in FIG. 1.

As the object of interest is identified by using the bounding box, the said object of interest is considered as the template image, and by implementing the image matching algorithm using the analysis engine 111, the said identified object is searched in the upcoming frames to find a match in a window around the last position. Hence, the tracking of the object of interest takes place in the further upcoming frames.

For example, in an embodiment of the invention, if the object of interest is identified in the first video frame f1 at time t1 on the broadcasted video at location x1, then in the upcoming frames f2, f3 . . . fn, by matching the identified object of interest that was tracked at time t1 is further tracked at time t2, t3 . . . . In at locations x2, x3 . . . xn respectively. The matching algorithm implemented by the analysis engine 111 enables the tracking of the identified object of interest in the upcoming frames f2, f3 . . . fn.

The identified object of interest tracked is then tagged and augmented using crowd sourcing technique. Crowd sourcing is used for augmenting knowledge among different communities across the globe by using the tags generated.

Thus, the identified object of interest is further furnished with additional information to generate immediate metadata related to the tracked object. For example, as indicated in the movie example, the actor will be tracked by multiple users connected through social community network by means of inputting tags related to the identified actor in the upcoming video frames.

One user connected in the network may input then name of the actor, the other may include the actor's upcoming movies, and the third may input actor's spouse information. Similarly, other users may input additional information about the identified actor in the upcoming video frames. This information is a metadata that is used to track the actor in the future. The generated metadata is uploaded to the metadata database 110 using REST.

The paired devices 107 connected to the internet have the ability to offload some of their computation on other servers in case they do not possess sufficient computational power themselves via cloud services 109.

These tags are shared across the users via an aggregation server where users are allowed to correct and augment such tags. In an embodiment, websites like IMDB and Wikipedia are used for suggestions by the users to extract more information for such tags. The tags may not be mere descriptions but might be student notes, Q & A, and general comments for an educational content. Similarly, other genre of broadcast can be similarly augmented.

A shown in FIG. 1, social networking sites such as Twitter 112-2 and Facebook 112-3 are used for social sharing of tags. Also, the information database Wikipedia 112-1 is used to get more content related to the tags and for automated tagging efforts. Analysis engine 111 further helps in image analysis of scenes or for any context analysis of generated metadata as well.

Thus, the invention presents uses crowd sourcing to help generate tagged metadata for user identified objects of interest on TV. Users indicate bounded boxes around their objects, thereby simplifying the problem of object detection. Social networks come into play to make the tagging a fun social activity while solving the problem of recognition. The method proposed will enable people connected in a social-community network to use the bounding box just for fun, but in the end it will help in creating metadata in video frames and proper tagging of objects in video frame.

Figure 2:
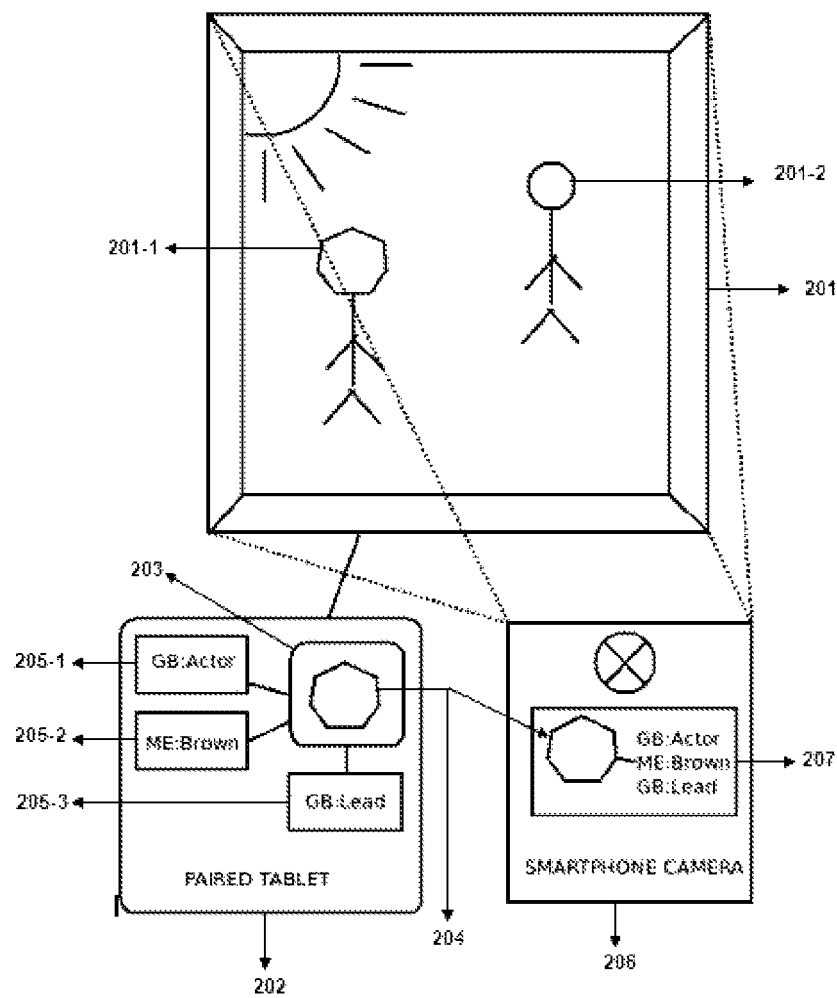
FIG. 2 shows a block-diagram 200 enabling crowdsourced tagging of objects on TV managed from paired handheld/Smartphone camera in accordance an embodiment of the invention.

FIG. 2 shows an example of tagging a particular object in a video broadcasted on a TV in accordance to an embodiment of the present invention. As shown in FIG. 2, a connected TV 201 is paired with a handheld Tablet 202 via Bluetooth or WI-FI. The video broadcasted on the TV 201 may be divided into plurality of objects. As shown in FIG. 2, 201-1, 201-2, 201-3 may be indicated as multiple objects of the video broadcasted on TV 201.

With the increasing trend of TV viewing with a second screen, in an embodiment of the present invention the broadcasted video can be pushed to the user's connected Tablet 201 paired with the TV 201. In other embodiments, the broadcasted video can be pushed if connected with the TV 201 to user's laptop or smart phone acting as a paired device 202.

As shown in the FIG. 2, the screen area of the Tablet 202 is adjusted corresponding to viewable area of the TV 201. This is done to make the picture displayed on TV screen compatible to the display area of the Tablet 202 so that the objects of interest can be tracked efficiently.

As indicted in FIG. 2, the user "ME" is currently logged in to the Tablet 202. As discussed, the user enables selection of object of interest in the video by indicating the boundary-box. In an embodiment, the user "ME" selects using her fingers the face of an actor 201-1 as an object of interest indicated in FIG. 2 in the scene on displayed on the Tablet 202. In another embodiment, the camera in the TV 201 can be used to take input as users' gesture to capture the objects of interest indicated by a boundary-box. The boundary-box 203 is shown that indicates the boundaries of the object to be tracked in the upcoming video frames. As shown, the face of an actor 201-1 is bounded by the boundary-box 203 referred as 204 in the FIG. 2.

Now, the selection of the face of the actor 204 in the scene by the user '"ME" displays the existing tags related to the face of the actor from the other users connected in the social-community network. For example, as shown in FIG. 2, the existing tags from the user "ME""'s friend "GB" is displayed as bubbles near the selection of the object. The tags indicated by GB are shown as bubbles 205-1 and 205-3 referred as tags "Actor" and "Lead" respectively.

Further, the user "ME" is able to add her own tags to the same object and is allowed to share it. As shown in the FIG. 2, the tag "Brown" added by the user "ME" is displayed as bubble 205-2. Further, these tags can be augmented by the users using additional information from the online service providers such as IMDB and Wikipedia. Also, the tags can be augmented by providing share and ask buttons to have interaction among different users using social networking sites such as Facebook and Twitter. This adds additional information to the generated tags from the multiple users connected in a social community network give rise to immediate metadata. This metadata helps in tracking the object 204 in the upcoming video frames. This technique of utilizing the different users from the social community network for augmenting knowledge is called as "Crowd sourcing".

Further, the generated metadata is uploaded on a metadata database for future tracking of the object in the upcoming video frames using REST.

The paired device 202 connected to the internet have the ability to offload some of their computation on other servers in case they do not possess sufficient computational power themselves. For example, cloud services as shown in FIG. 1 are being implemented to possess the sufficient computational power.

Figure 3:
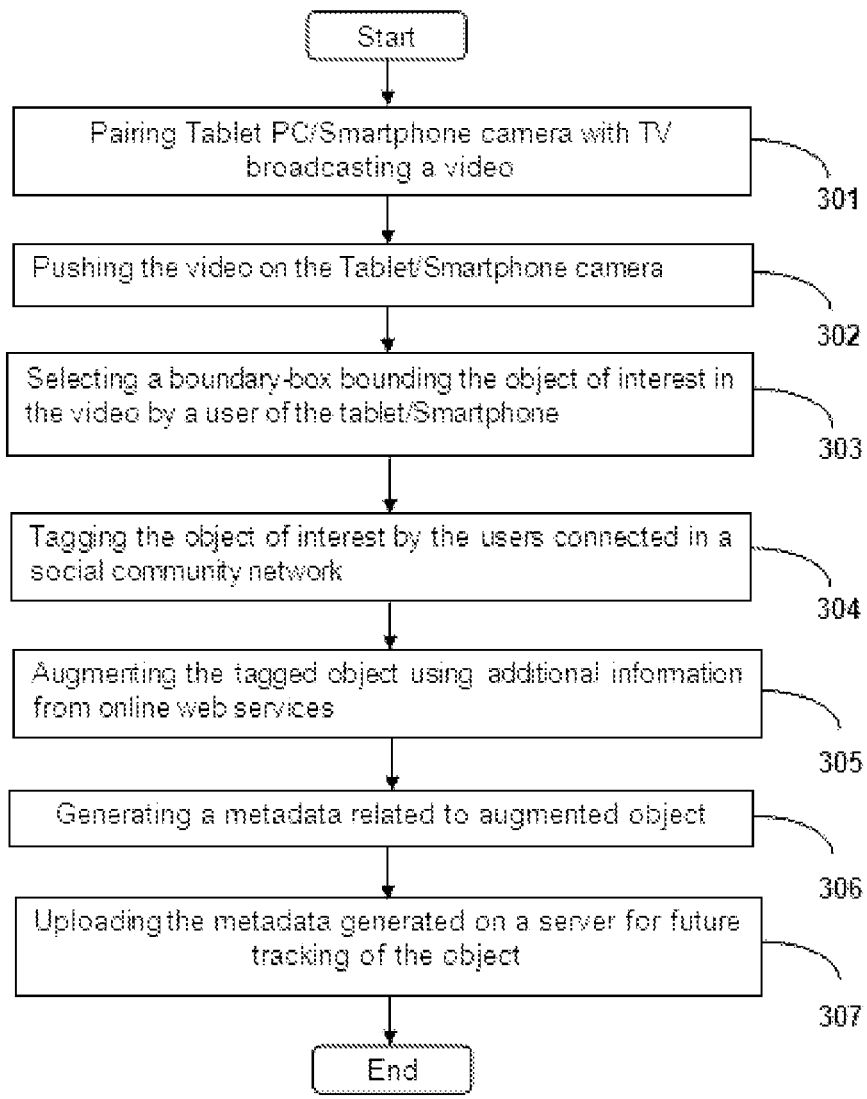
FIG. 3 is a flow chart 300 showing different steps implemented for tagging objects in a video on a TV using crowd sourcing technique in accordance to an embodiment of the invention.

FIG. 3 shows a flow chart 300 depicting steps for tagging objects in a video on a TV using crowd sourcing technique in accordance to an embodiment of the invention.

At step 301, Tablet PC/Smartphone camera is paired with the TV broadcasting the video.

At step 302, the video broadcasted on TV is pushed to the paired Tablet PC/Smartphone camera.

At step 303, a boundary-box bounding the object of interest in the video is selected by a user of the tablet/Smartphone.

At step 304, the object of interest in the bounding-box is tagged by the users connected in a social community network in the upcoming video frames.

At step 305, the tagged object is augmented by adding additional information from online web services.

At step 306, a metadata related to augmented object is generated based on tagged information related to the object.

At step 307, the metadata generated is uploaded on a server for future tracking of the object.

The methodology and techniques described with respect to the embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other rewritable (volatile) memories; magneto-optical or optical medium such as a disk or tape; no transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments of the invention. Persons skilled in the art and technology to which this Invention pertains will appreciate that alterations and changes in the described structures and methods of operation can be practiced without meaningfully departing from the principle, spirit and scope of this invention.

Advantages of the Invention

The present invention has following advantages:

The present invention simplifies the problem of object identification and recognition on TV, which are long standing computationally hard problems of image processing.

The metadata generated for each video via crowd sourcing can be uploaded to online services and stored for both future uses as well as re-used as part of rich interactive multimedia applications.

The present invention enables tagging of objects in a social TV using crowd sourcing where people tag for fun and generate metadata as a result of tagging.

The present invention enables by way of tagged objects other users connected in a social community network to know the interesting objects in the current videos.

We claim:

1. A method of tagging of objects of interests in a video during real-time broadcasting using crowd sourcing, the method comprising:

providing, via a first communication device including a hardware processor, at least one media for display to a user of the first communication device, wherein the at least one media is being broadcasted via a second communication device, and wherein the at least one media is provided for display, via the first communication device, by pairing the first communication device with the second communication device, wherein the screen area of the first communication device is adjusted corresponding to viewable area of the second communication device;

receiving, via the first communication device, user input, from the user, indicating at least one bounding-box to be displayed, corresponding to the at least one media being broadcasted, on the first communication device;

identifying at least one object of interest, depicted in the at least one media being broadcasted, within the at least one bounding-box wherein at least one object of interest is identified at first video frame f1 at time t1 on the at least one media being broadcasted at location x1;

searching, via the first communication device, the identified at least one object of interest in one or more subsequent broadcast frames of the at least one media being broadcasted wherein the identified at least one object of interest at time t1 is matched at time t2, t3 . . . tn in the one or more subsequent frames f2, f3 . . . fn at locations x2, x3 . . . xn;

tagging and augmenting the tracked at least one object by using a crowd sourcing technique, wherein the tagging and augmentation, using the crowd sourcing technique, comprises receiving, on the first communication device, a plurality of tags associated with the at least one object, wherein the plurality of tags is received, during the broadcast of the at least one media, from the user and a plurality of users communicatively coupled with the user over a plurality of social networking websites via an internet, wherein at least one tag is received in at least one broadcast frame of the at least one media being broadcasted, and augmenting the plurality of tags with additional information received from the plurality of users;

generating, in real time, metadata related to the at least one object based on the tagging and the augmentation of the at least one object; and uploading the generated metadata related to the at least one object.

2. The method of claim 1, wherein the at least one bounding-box is indicated as an area of tracking the at least one object in the at least one media being broadcasted.

3. The method of claim 1, wherein the at least one object is tracked using an image matching algorithm.

4. The method of claim 1, wherein the metadata generated related to the at least one tagged object is uploaded to an aggregation server using REST protocol.

5. The method of claim 1, wherein the at least one bounding-box is indicated by a user using an input device associated with one of the first communication device and the second communication device or using gesture inputs associated with the user.

6. The method of claim 1, wherein the first communication device is selected from a group consisting of: Tablet PC, desktop, laptop and Smartphone.

7. The method of claim 5, wherein the second communication device is selected from a group consisting of: television, desktop, laptop and mobile phone.

8. A system for tagging of objects of interests in a video during real-time broadcasting using crowd sourcing, the system comprising:

a first communication device paired with a second communication device, wherein the first communication device comprises a processor; and a memory coupled to the processor storing instructions that when executed cause the processor to:

provide at least one media for display a user of the first communication devices, wherein the at least one media is being broadcasted via the second communication device, and wherein the at least one media is provided for display, via the first communication device, based upon the pairing of the first communication device with the second communication device, wherein the screen area of the first communication device is adjusted corresponding to viewable area of the second communication device;

receive user input, from the user, to indicate at least one bounding-box to be displayed, corresponding to the at least one media being broadcasted, on the first communication device;

identify at least one object of interest depicted in the at least one media being broadcasted, within the at least one bounding-box wherein at least one object of interest is identified at first video frame f1 at time t1 on the at least one media being broadcasted at location x1;

search the identified at least one object of interest in one or more subsequent broadcast frames of the at least one media being broadcasted wherein the identified at least one object of interest at time t1 is matched at time t2, t3 . . . tn in the one or more subsequent frames f2, f3 . . . fn at locations x2, x3 . . . xn;

tag and augment the tracked at least one object by using a crowd sourcing technique, wherein the tagging and augmentation, using the crowd sourcing technique, comprises receiving, on the first communication device, a plurality of tags associated with the at least one object, wherein the plurality of tags is received, during the broadcast of the at least one media, from the user and a plurality of users communicatively coupled with the user over a plurality of social networking websites via an internet, wherein at least one tag is received in at least one broadcast frame of the at least one media being broadcasted, and augmenting the plurality of tags with additional information received from the plurality of users;

generate, in real time, metadata related to the at least one object based on the tagging and the augmentation of the at least one object; and upload the generated metadata.

9. The system of claim 8, wherein the at least one bounding-box is indicated as an area of tracking the at least one object in the at least one media being broadcasted.

10. The system of claim 8, wherein the at least one object is tracked using an image matching algorithm.

11. The system of claim 8, wherein the metadata generated related to the at least one tagged object is uploaded to an aggregation server using REST protocol.

12. The system of claim 8, wherein the at least one bounding-box is indicated by a user using an input device associated with one of the first communication device and the second communication device or gesture inputs associated with the user.

13. The system of claim 8, wherein the second communication device further includes a camera for capturing the user inputs via hand gestures to capture the objects of interest indicated by a boundary-box.

* * * * *